No. 689,155. Patented Dec. 17, 1901.
F. BATEMAN.
WHEEL CULTIVATOR.
(Application filed Oct. 25, 1900.)
(No Model.) 2 Sheets—Sheet 1.

Witnesses:
Inventor:
Frank Bateman
by
his Attorneys

No. 689,155. Patented Dec. 17, 1901.
F. BATEMAN.
WHEEL CULTIVATOR.
(Application filed Oct. 25, 1900.)
(No Model.) 2 Sheets—Sheet 2.

Witnesses:—
Frank H. Graham.
Louis W. Holzheimer.

Inventor:—
Frank Bateman,
by his Attorneys:—
Howson & Howson

THE NORRIS PETERS CO., PHOTO-LITHO., WASHINGTON, D. C.

UNITED STATES PATENT OFFICE.

FRANK BATEMAN, OF GRENLOCH, NEW JERSEY, ASSIGNOR TO THE BATEMAN MANUFACTURING COMPANY, OF GRENLOCH, NEW JERSEY, A CORPORATION OF NEW JERSEY.

WHEEL-CULTIVATOR.

SPECIFICATION forming part of Letters Patent No. 689,155, dated December 17, 1901.

Application filed October 25, 1900. Serial No. 34,387. (No model.)

*To all whom it may concern:*

Be it known that I, FRANK BATEMAN, a citizen of the United States, residing in Grenloch, New Jersey, have invented certain Improvements in Wheel-Cultivators, of which the following is a specification.

My invention consists of certain improvements in the wheel-cultivator forming the subject of my application for patent, Serial No. 737,468, filed November 18, 1899, the objects of my present invention being to simplify and cheapen the construction of the bar which carries the cultivator-blades and to provide a strong and secure mounting for said blades. These objects I attain in the manner hereinafter set forth, reference being had to the accompanying drawings, in which—

Figure 1:
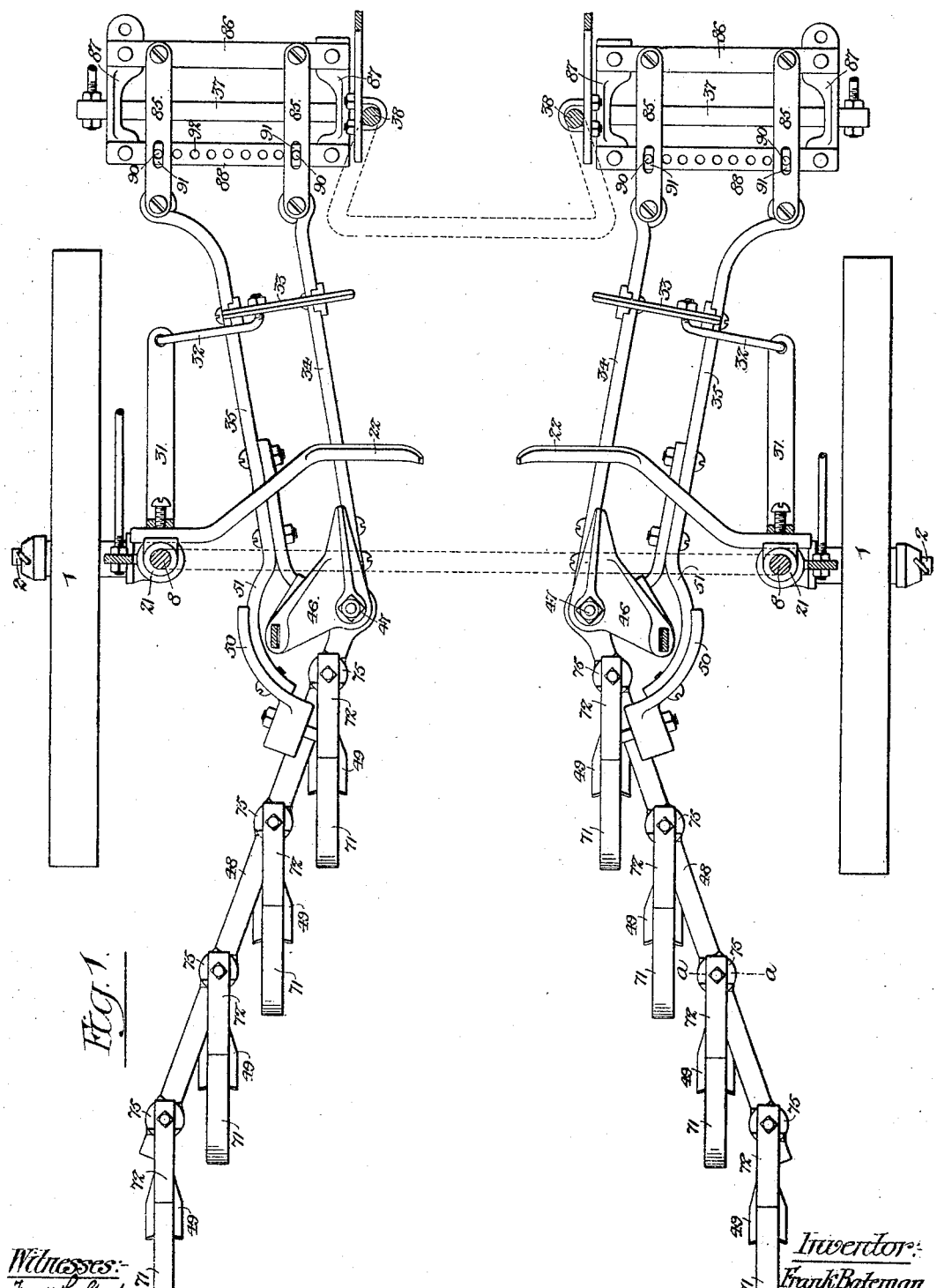
Figure 4:
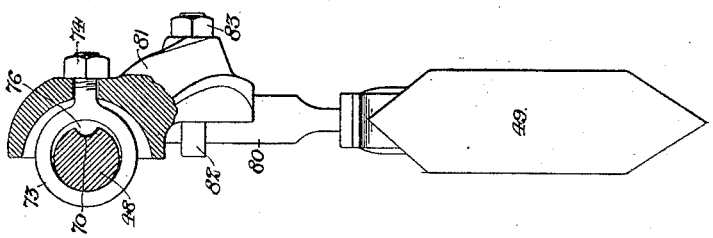
Figure 3:
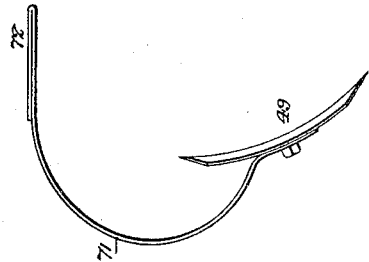
Figure 2:
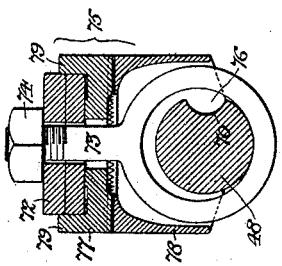

Figure 1 is a plan view, partly in section, of sufficient of a wheel-cultivator to illustrate my present invention. Fig. 2 is an enlarged section on the line *a a*, Fig. 1. Fig. 3 is a detached view of a spring hook or blade constructed in accordance with my invention, and Fig. 4 is an enlarged transverse section illustrating the application of my invention to another form of cultivator-blade.

In Fig. 1 the wheels of the cultivator are represented at 1, the axles at 2, and part of the arched rear frame of the implement at 8, the foot rests or treadles whereby the wheels are swung to right or left being represented at 22 and the sleeves whereby the movement of these foot-rests is transmitted to the axles being shown at 21. Each of said sleeves also has a forwardly-projecting arm 31, which is connected by a rod 32 to a perforated bar 33, mounted upon a pair of bars 34 and 35, which constitute the forward members of the structure carrying the gang of cultivator-blades, these bars being connected at their rear ends to a block 46, which carries the pivot-bolt 47 for the rear bar 48 of the gang structure upon which the series of cultivator blades or teeth 49 are mounted, said rear bar being adjustable to different angles in respect to the forward structure and being secured in its different positions of angular adjustment by locking together overlapping segmental arms 50 and 51, carried, respectively, by the rear bar 48 and the front bar 35. All of these parts are similar to those shown and described in my former application, with the exception of the rear bar 48, which instead of being a flat oblong duplex bar, as in the former machine, is now a round bar with a groove 70 in one side of the same, the front end of the bar being shaped so as to form an eye, which is hung to the pivot-bolt 47. This bar with its groove can be readily rolled and constitutes a cheap and acceptable substitute for the bar formerly employed.

Each of the blades or teeth 49 is secured to the lower end of the curved spring arm or shank 71, consisting of a single piece of sheet-steel or other resilient metal folded back upon itself at the top, so as to form a thickened head 72, which adds strength to the spring-arm and increases the stiffness of the spring. The head 72 is perforated for the reception of the shank of an eyebolt 73, having a nut 74, whereby the head of the shank 71 is secured to the carrier-block 75, which is also secured to the bar 48 by means of said eye-bolt 73, the latter embracing the bar and the carrier-block 75 having a rib 76 for engaging with the groove 70 of the bar, so as to prevent the carrier-block from turning or twisting on said bar.

The carrier-block 75 is composed of upper and lower sections 77 and 78, having their contacting portions notched or toothed, as shown in Fig. 2, so that when the nut 74 is tightened upon the bolt 73 these two portions of the block will be rigidly locked together, and the upper portion will be prevented from turning in respect to the lower portion; but by slackening the nut upon the bolt 73 to an extent sufficient to permit the toothed portions of the block to move out of engagement with each other the upper portion of the block is susceptible of being turned around the axis of the bolt 73, so as to provide for any desired angular adjustment of the cultivator blade or tooth 49 in respect to the line of the bar 48, it being understood that the head 72 of the tooth-carrying shank 71 is rigidly confined to the upper portion 77 of the carrier-block 75 by reason of the edge ribs or flanges 79, as shown in Fig. 2.

In adapting the grooved rod 48 to that class of cultivators in which the cultivator-blades are provided with a stem or shank 80 I use a duplex carrier 81, having an upper portion recessed for the reception of the bar 48 and eyebolt 73 and having a rib 76 for engaging with the groove in said bar 48, the lower portion of the block 81 having a recessed vertical portion for the reception of the vertical stem or shank 80 of the cultivator-blade, which is secured to the block by means of a second eyebolt 82 with nut 83, as shown in Fig. 4.

The front ends of the forward bars 34 and 35 of the gang structure are also hung to the fixed frame of the machine in a manner different from that formerly adopted in order to provide for the easier movement of the gang structure and to permit of the locking of the same in position when desired.

The front end of each of the bars 34 and 35 is secured to the rear end of a swinging arm 85, which is pivoted at its front end to the cross-bar 86 of a frame comprising, in addition to said front cross-bar, a pair of end bars 87 and a rear bar 88, these parts being rigidly secured together, so as to constitute a rectangular frame which is supported upon the lateral extensions 37 of the arched front frame 38 of the machine, so that the gang structure can pivot upon the bars 37 in raising and lowering the same. The pivoted arms 85 thus constitute a parallel motion hanger for the front end of the gang structure and permit said gang structure to be moved bodily in a lateral direction, as before, without the friction caused by the sliding of the carrier-sleeve upon the rods 37, as in the former construction. Furthermore, the present method of hanging the gang structure permits of the locking of the same by the use of pins 90, adapted to slots 91 in the arms 85 and to openings 92 in the bar 88, so that by releasing the connections between the rods 32 and the bars 33 the machine can be readily transformed into one with swinging wheels and fixed gangs when such machine is desired.

Having thus described my invention, I claim and desire to secure by Letters Patent—

1. The combination in a cultivator, of a round bar having a groove therein, with a cultivator-blade carrier having a rib for engagement with said groove, and means for securing said blade-carrier in place upon the bar, substantially as specified.

2. The combination in a cultivator, of a round bar having a groove in one side of the same, with a cultivator-blade carrier, and an eyebolt whereby the same is secured to the bar, said blade-carrier being recessed for the reception of the bar and eyebolt and ribbed for engagement with the groove of the bar, substantially as specified.

3. The combination in a cultivator, of the blade-carrying bar, the cultivator-blade and its stem or shank, the carrier-block in which said stem is seated, and an eyebolt through whose eye the blade-carrying bar passes, the stem of the bolt engaging with the blade-carrier and having a nut whereby said blade-carrier and its blade are secured to the bar, substantially as specified.

4. The combination in a cultivator, of the blade-carrying bar, the cultivator-blade having a curved stem or shank folded back upon itself at the upper end so as to form a thickened head, the carrier-block in which said thickened head of the stem is seated and the eyebolt through whose eye portion the blade-carrying bar passes, the stem of said bolt projecting through an opening in the blade-carrier and in the thickened head of the blade and being provided with a nut whereby said blade is secured to the carrier and the latter to the bar, substantially as specified.

In testimony whereof I have signed my name to this specification in the presence of two subscribing witnesses.

FRANK BATEMAN.

Witnesses:
 F. E. BECHTOLD,
 JOS. H. KLEIN.